(12) United States Patent
Xiao et al.

(10) Patent No.: US 9,942,331 B2
(45) Date of Patent: Apr. 10, 2018

(54) UTILIZATION OF COMPUTING SERVICES (71) Applicant: International Business Machines Corporation, Armonk, NY (US)

(72) Inventors: Yi Xiao, ShangHai (CN); Guang Yang, Beijing (CN); Jia Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 14/737,531

(22) Filed: Jun. 12, 2015

(65) Prior Publication Data

US 2016/0366231 A1    Dec. 15, 2016

(51) Int. Cl.
G06F 15/16 (2006.01)
H04L 29/08 (2006.01)
G06F 9/00 (2006.01)

(52) U.S. Cl.
CPC ............... H04L 67/14 (2013.01); G06F 9/00 (2013.01); *H04L 67/10* (2013.01)

(58) Field of Classification Search
USPC ................. 709/229, 223, 217, 227
See application file for complete search history.

(56) References Cited

U.S. PATENT DOCUMENTS

| 8,645,529 B2 | 2/2014 | Doddavula |
| 8,719,804 B2 | 5/2014 | Jain |
| 2010/0131948 A1 | 5/2010 | Ferris |
| 2011/0138047 A1 | 6/2011 | Brown et al. |
| 2011/0138050 A1 | 6/2011 | Dawson et al. |
| 2011/0145392 A1 | 6/2011 | Dawson et al. |
| 2012/0102103 A1 | 4/2012 | Jacobson et al. |
| 2013/0019015 A1 | 1/2013 | Devarakonda et al. |
| 2013/0080842 A1* | 3/2013 | Peacock ................. H04L 47/27 714/48 |
| 2014/0033268 A1 | 1/2014 | Julisch et al. |
| 2014/0068611 A1 | 3/2014 | McGrath et al. |
| 2014/0074973 A1 | 3/2014 | Kumar et al. |
| 2014/0075426 A1 | 3/2014 | West et al. |
| 2015/0113546 A1 | 4/2015 | Huang et al. |
| 2016/0306996 A1* | 10/2016 | Kulkarni ................ G06Q 10/10 |
| 2017/0054712 A1* | 2/2017 | Wetter ................ H04L 63/0853 |

FOREIGN PATENT DOCUMENTS

CN    102821000 A    12/2012

* cited by examiner

*Primary Examiner* — Lan-Dai T Truong
(74) *Attorney, Agent, or Firm* — Steven F. McDaniel (57) ABSTRACT

A method to connect an application to an application service includes accessing code corresponding to an application to determine a reference to an application service, determining a service connection driver corresponding to the application service, invoking the service connection driver, and receiving connection information in response to the service connection driver establishing a service connection between the application and the application service. A corresponding computer program product and computer system are also disclosed herein.

20 Claims, 5 Drawing Sheets

UTILIZATION OF COMPUTING SERVICES

BACKGROUND OF THE INVENTION

The present invention relates generally to computing services and specifically to utilization of computing services.

Applications such as cloud applications that use services such as cloud services must establish a connection to each service before the service can be utilized. Typically, at least a portion of the connection process (a.k.a. wiring) is manually conducted by an operator. For example, an operator may review documentation written by the developer of an application on what services are required by the application and input command line commands to activate the services and establish service connections. Those services may in turn require other services which must be wired to the application and cannot be recycled as long as the application is running. Consequently, the utilization of executing services may be very low.

SUMMARY

A method to connect an application to an application service includes accessing code corresponding to an application to determine a reference to an application service, determining a service connection driver corresponding to the application service, invoking the service connection driver, and receiving connection information in response to the service connection driver establishing a service connection between the application and the application service. A corresponding computer program product and computer system are also disclosed herein.

DETAILED DESCRIPTION

The embodiments disclosed herein enable applications to connect to services in a manner that improves service utilization.

Figure 1:
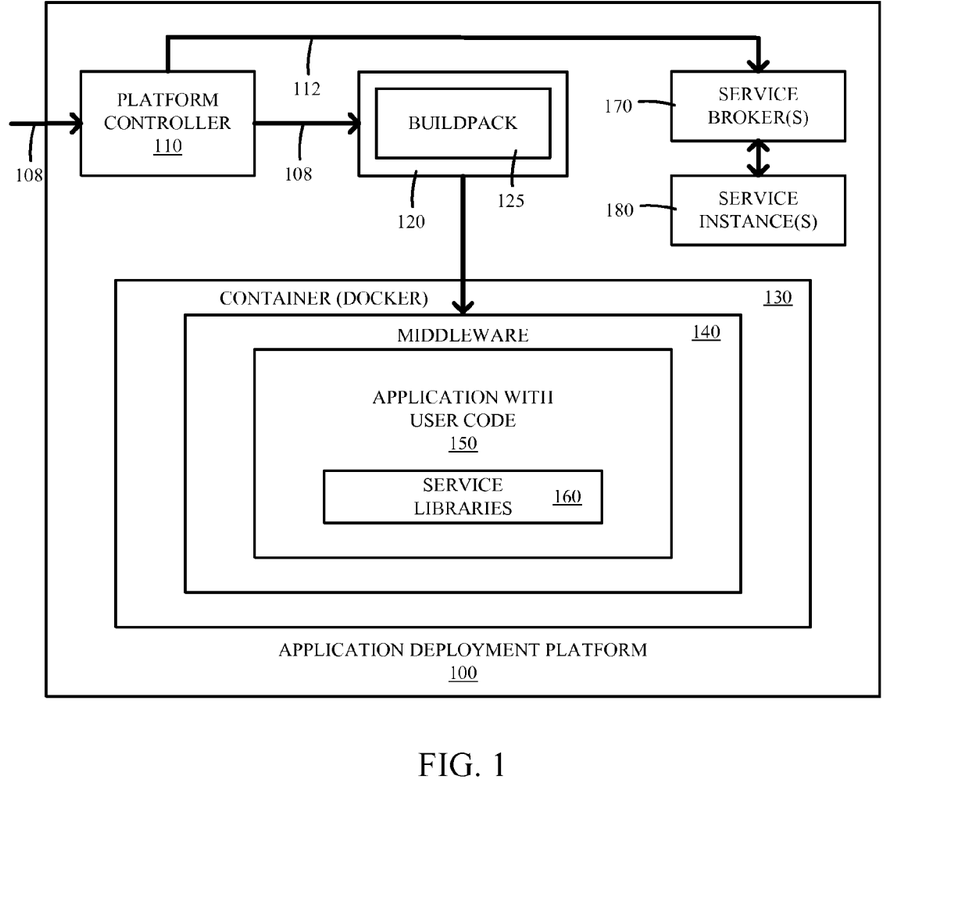
FIG. 1 is a functional block diagram depicting one example of an application deployment platform that illustrates issues related to deploying applications that use services.

FIG. 1 is a functional block diagram depicting one example of an application deployment platform 100 that illustrates issues related to deploying applications that use services. As depicted, the application deployment platform 100 includes a platform controller 110, a build module 120, a container 130, middleware 140, an application 150, service libraries 160, service broker(s) 170, and service instance(s) 180. The application deployment platform 100 provides an execution platform for applications that use one or more services provided by the service instance(s) 180.

The platform controller 110 may receive application code 108 corresponding to an application and provide the application code to the build module 120. The platform controller may also interact with one or more operators (not shown) that specify the services that may be needed to run the application. In some embodiments, the operators provide commands 112 to the platform controller to activate one or more services. In the depicted embodiment, the commands 112 activate the service instances 180 via one or more service brokers 170. The commands 112 may be service specific. The operators may consult documentation, provided by an application developer, that indicates what services are required and/or the parameters required by the services.

The build module 120 may package the application code 108 along with the middleware 140 and the service libraries 160 into a runtime package 125. In some embodiments, the runtime package conforms to an archiving format such as the Java™ archiving (JAR) format. [Note: the terms "Java™" and "JAR" may be subject to trademark rights in various jurisdictions throughout the world and is used here only in reference to the products or services properly denominated by the marks to the extent that such trademark rights may exist.] The runtime package 125 may be compressed for compactness.

The container 130 may receive and decompress runtime package 125 and extract the middleware 140, application 150, and service libraries 160 therefrom. Subsequently, the container 130 or platform controller 110 may launch the application 150. The application 150 may use the services provided by the service instances. Upon completion of the application, the platform controller 110 may release the service instance(s) 180 via the service broker(s) 170.

The platform controller 110 may have no knowledge of when the services provided by the service instance(s) 180 are needed. Consequently, the service instance(s) 180 must typically be created (in order to available for requests) before the application 150 is launched. As a result, the service instance(s) 180 may be allocated to the application 150 for the entire lifecycle of the application 150.

Figure 2:
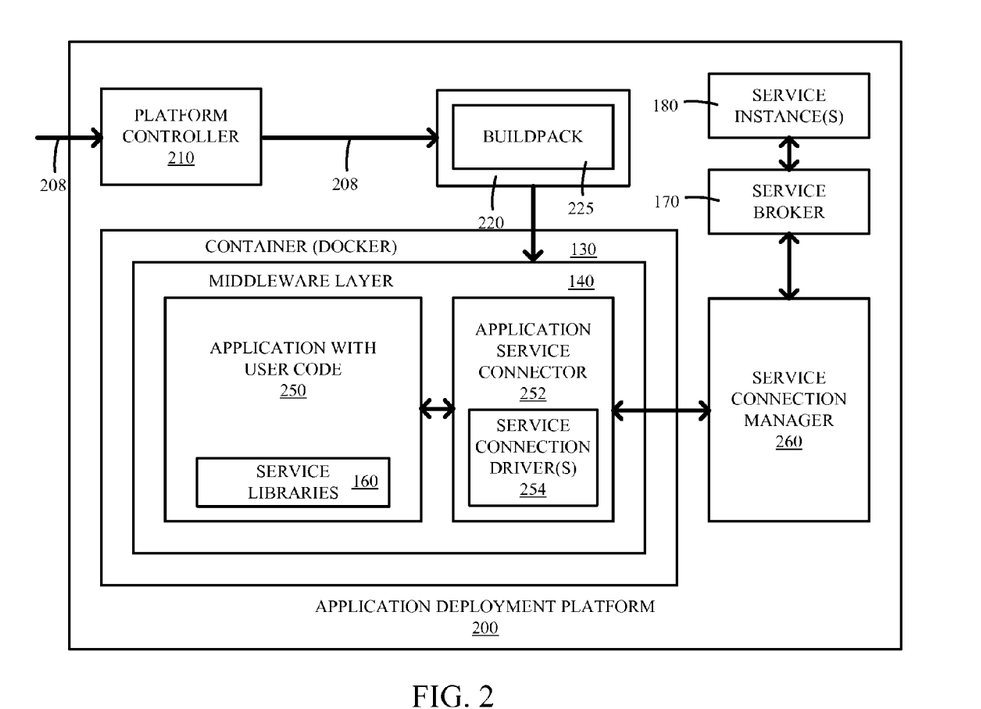
FIG. 2 is a functional block diagram depicting one example of an application deployment platform in which at least one embodiment of the present invention may be deployed.

FIG. 2 is a functional block diagram depicting one example of an application deployment platform 200 in which at least one embodiment of the present invention may be deployed. As depicted, the application deployment platform 200 includes many of the elements of the application deployment platform 100 such as the container 130, middleware 140, service libraries 160, the service broker(s) 170, and one or more services instances 180. In addition to, or in place of some of the functional units of the platform 100, the application deployment platform 200 includes a platform controller 210, a build module 220, an application 250, an application service connector 252, one or more service connection drivers 254, and a service connection manager 260. The application deployment platform 200 enables deployment of applications 250 that use services without requiring operator intervention.

In contrast to the platform controller 110, the platform controller 210 is not required to establish a connection with the service instance(s) 180. Similar to the build module 120, the build module 220 may package application code 208 along with the middleware 140 and the service libraries 160 into a runtime package (which in the depicted example is the runtime package 225). However, the build module 220 may also include the application service connector 252 and one or more service connection drivers 254 in the runtime package 225. Similar to the runtime package 125, the runtime package 225 may conform to an archiving format such as the JAR format. The runtime package 225 may also be compressed for compactness.

The container 130 may receive and decompress runtime package 225 and extract the middleware 140, application 150, and service libraries 160, application service connector 252, and one or more service connection drivers 254, therefrom. Subsequently, the container 130 or platform controller 210 may launch the application 150. The application 250 may require usage of various services. In the depicted embodiment, the application service connector 252 determines from the code 208 of the application 250 which services are required by the application. The application service connector 252 may also identify a service connection driver 254 that corresponds to each required service. For example, the application service connector 252 may parse the code 208 to determine the appropriate service connection driver 254. For example, in some embodiments the potentially required services and corresponding service connection drivers are determined by annotations or metadata within the code 208. In other embodiments, the services and corresponding service connection drivers 254 are determined by evaluating function calls and associated parameters within the code 208.

The service connection driver 254 establishes a service connection between the application 250 and the appropriate service instance 180 (e.g., via the service connection manager 260). In some embodiments, the application service connector 252 and/or the service connection driver 254 receive connection information such as a credentials (not shown) from the appropriate service instance 180. The application service connector 252 may incorporate the connection information within a software object and inject the software object within the executing application 250. In some embodiments, the connection information includes credentials and one or more URLs that are used to access the application service. In one embodiment, the software object containing the connection information is injected via a dynamic class loader which is invoked by application service connector 252 to create an instance of the software object within the executing application 250. In some embodiments, annotations within the code 208 indicate where the software object should be injected. When the software object is released, either via explicit function calls or via garbage collection, the service connection manager 260 or the application service connector 252 may detect the release event and close the connection and release usage of the service instance(s) 180 via the service broker(s) 170. Consequently, the service instance(s) 180 need not be retained for the entire execution lifecycle of the application 250. In some embodiments, the service connection manager 260 or the service broker 170 maintains a reference count on how many applications are currently using each service so that services are not prematurely released. In one embodiment, the service connection manager 260 or the service broker 170 waits until the reference count for a service is zero for a selected interval before releasing the service.

Figure 3:
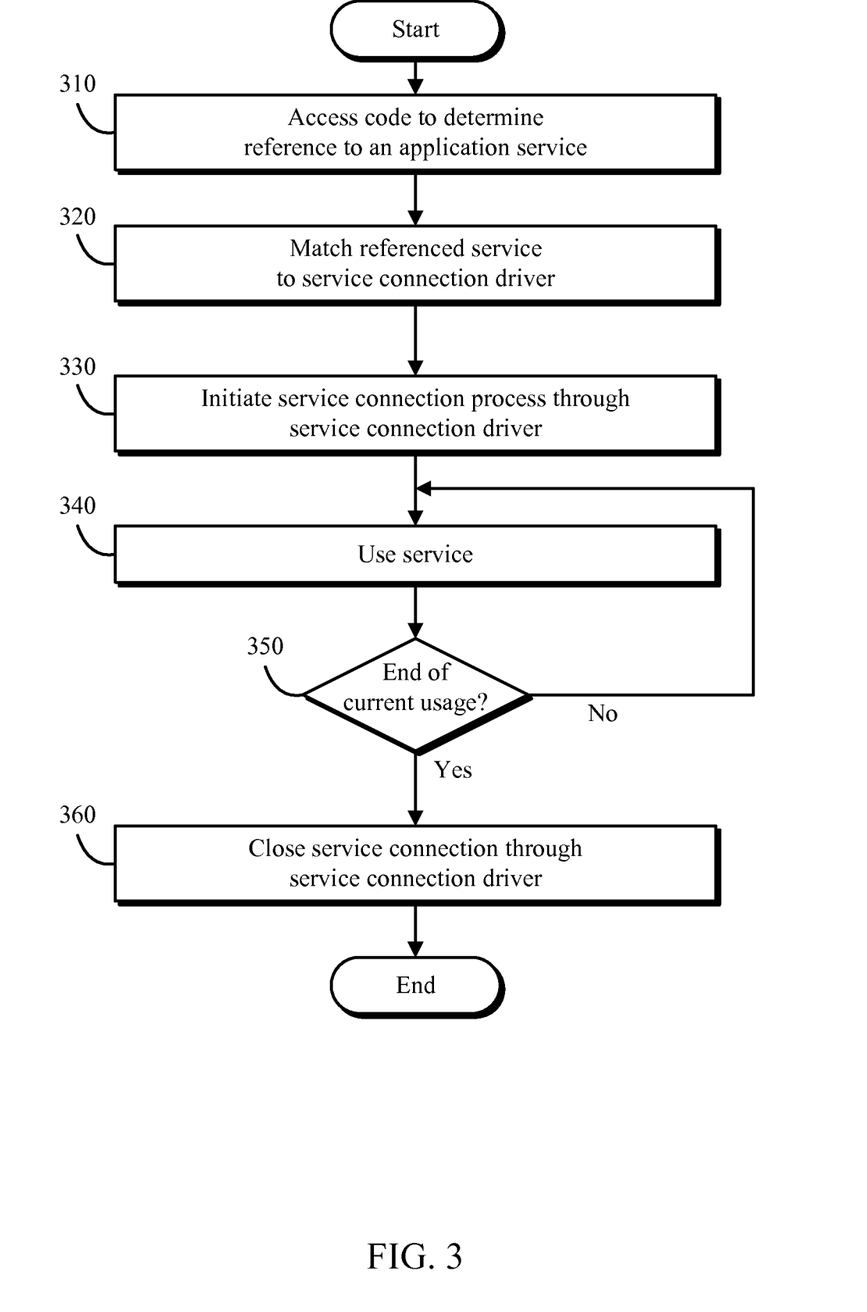
FIG. 3 is a flowchart depicting a service connection method in accordance with at least one embodiment of the present invention.

FIG. 3 is a flowchart depicting a service connection method 300 in accordance with at least one embodiment of the present invention. As depicted, the service connection method 300 includes accessing (310) code to determine a reference to an application service, matching (320) the referenced service to a service connection driver, initiating (330) a service connection process, using (340) the service, determining (350) whether current usage is no longer required, and closing (360) the service connection.

Accessing (310) code may include parsing code 208 within the application 250 and determining a reference to an application service. Matching (320) the referenced service to a service connection driver may include selecting the service connection driver that corresponds to the referenced service. Initiating (330) a service connection process may include the application service connector 252 using the service connection driver 254 to connect to the referenced service via the service connection manager 260. Using (340) the service may include making requests to the service and receiving responses from the service.

Determining (350) whether current usage has ended may include actively monitoring interaction with the service or processing an event corresponding to destruction or garbage collection of an code object. If current usage of the service has ended the method proceeds to closing (360) the service connection. Closing (360) the service connection may include releasing an instance of the service.

Figure 4:
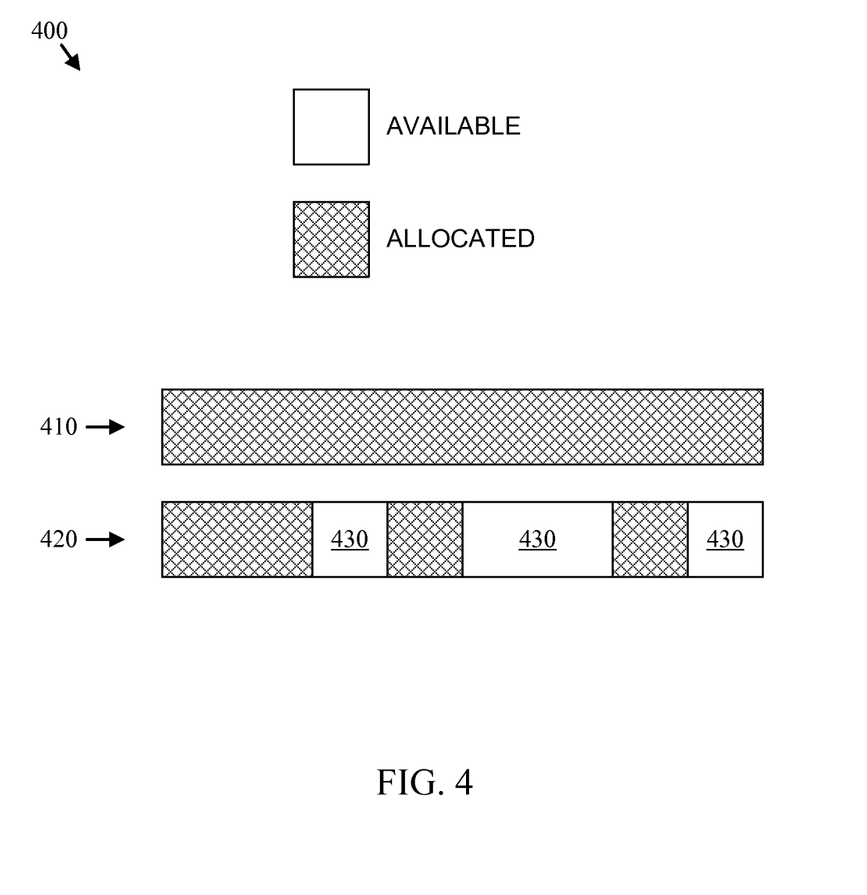
FIG. 4 is a chart illustrating the effect of various embodiments disclosed herein.

FIG. 4 is a chart 400 illustrating the effect of the embodiments disclosed herein. With a conventional approach 410 to connecting to services, a service may be connected to an application for the entire lifecycle of the application. By using the embodiments disclosed herein 420, the connection to the service may be released during periods 430 where the service is not used. In some embodiments, the lifecycle of application services are effectively 'wired' to the lifecycle of code objects within the application. In certain embodiments, connections to services may be established and released on demand within the code of the application.

Figure 5:
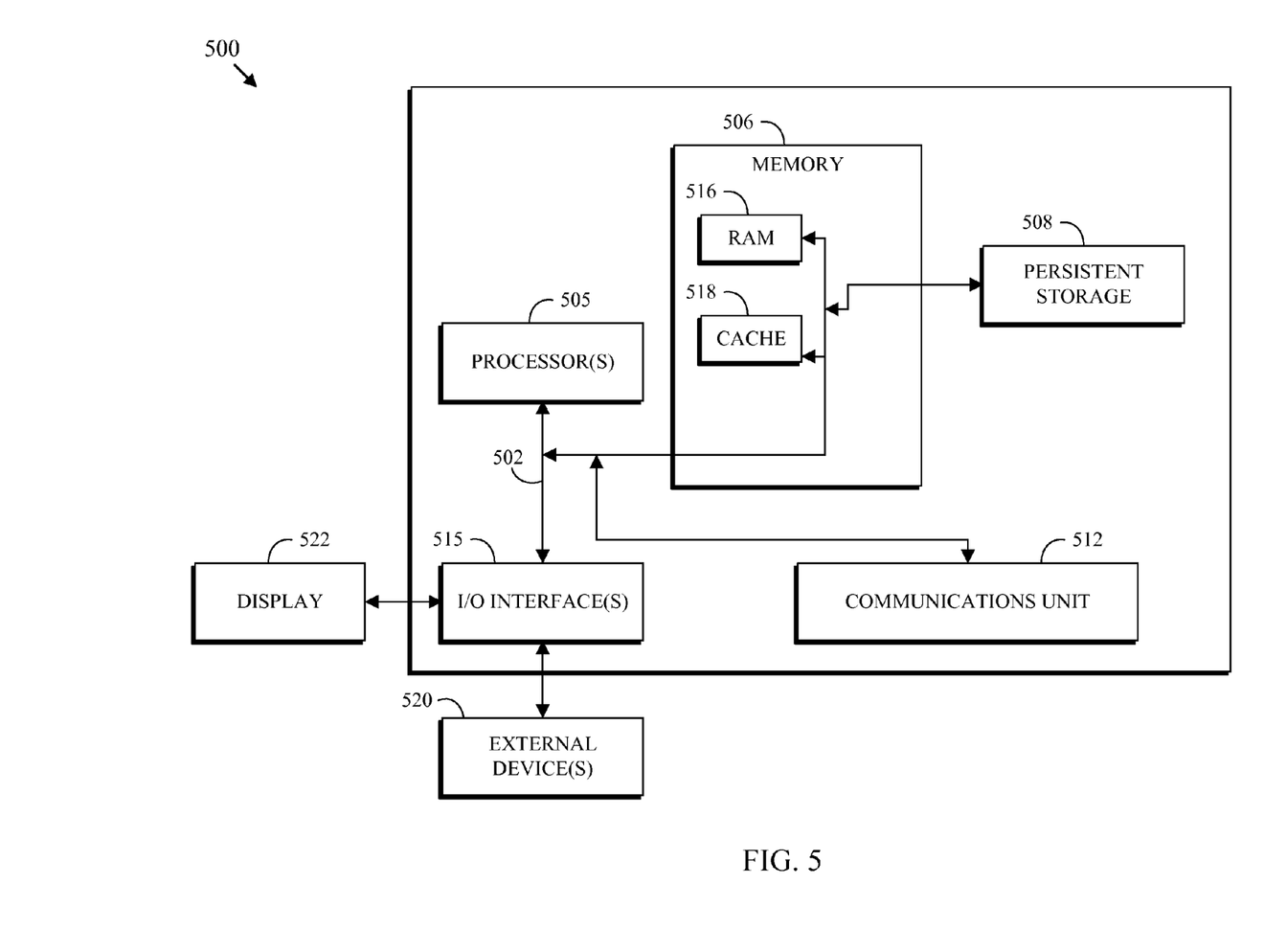
FIG. 5 is a block diagram depicting one example of a computing apparatus (i.e., computer) suitable for executing the methods disclosed herein.

FIG. 5 is a block diagram depicting one example of a computing apparatus (i.e., computer 500) suitable for executing the methods disclosed herein. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 505, memory 506, persistent storage 508, communications unit 512, and input/output (I/O) interface(s) 515. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 505 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 515 allows for input and output of data with other devices that may be connected to computer 500. For example, I/O interface 515 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 515. I/O interface(s) 515 may also connect to a display 522. Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method conducts by a computing apparatus to connect an application to an application service, the method comprising:
    accessing code corresponding to an application to determine a reference to an application service;
    determining a service connection driver corresponding to the application service; invoking the service connection driver; and
    receiving connection information in response to the service connection driver establishing a service connection between the application and the application service;
    providing the connection information to the application to enable the application to use the application service;
    determining that usage of the application service is no longer required by the application; and
    closing the service connection between the application and the application service.

2. The method of claim 1, wherein the connection information comprises credentials provided by the application service.

3. The method of claim 1, further comprising injecting the connection information into the application.

4. The method of claim 3, wherein injecting the connection information comprises injecting an object into an executing instance of the application.

5. The method of claim 1, further comprising determining that the service is no longer in use.

6. The method of claim 5, wherein determining that the service is no longer in use comprises detecting that an injected object corresponding to the application service has been released.

7. The method of claim 6, wherein detecting that the injected object has been released comprises accessing a reference to the injected object.

8. The method of claim 1, wherein the service connection is created by a service broker.

9. The method of claim 1, wherein the code comprises an annotation that corresponds to the application service.

10. A computer program product comprising:
    one or more computer readable storage media and program instructions stored on the one or more computer readable storage media, the program instructions comprising instructions to:
    access code corresponding to an application to determine a reference to an application service;
    determine a service connection driver corresponding to the application service;
    invoke the service connection driver;
    receive connection information in response to the service connection driver establishing a service connection between the application and the application service;
    provide the connection information to the application and thereby enable the application to use the application service;
    determine that usage of the application service is no longer required by the application; and
    close the service connection between the application and the application service.

11. The computer program product of claim 10, wherein the program instructions comprising instructions to inject the connection information into the application.

12. The computer program product of claim 11, wherein the instructions to inject the connection information comprise instructions to inject an object into an executing instance of the application.

13. The computer program product of claim 10, wherein the program instructions comprise instructions to determine that the service is no longer in use.

14. The computer program product of claim 13, wherein the instructions to determine that the service is no longer in use comprise instructions to detect that an injected object corresponding to the application service has been released.

15. The computer program product of claim 14, wherein the instructions to detect that the injected object has been released comprises instructions to access a reference to the injected object.

16. A computer system comprising:
    one or more computers;
    one or more computer readable storage media and program instructions stored on the one or more computer readable storage media for execution by at least one of the computers, the program instructions comprising instructions to:

access code corresponding to an application to determine a reference to an application service;

determine a service connection driver corresponding to the application service;

invoke the service connection driver;

receive connection information in response to the service connection driver establishing a service connection between the application and the application service;

provide the connection information to the application and thereby enable the application to use the application service;

determine that usage of the application service is no longer required by the application; and close the service connection between the application and the application service.

17. The computer system of claim 16, wherein the program instructions comprising instructions to inject the connection information into the application by injecting an object into an executing instance of the application.

18. The computer system of claim 16, wherein the program instructions comprise instructions to determine that the service is no longer in use.

19. The computer system of claim 18, wherein the instructions to determine that the service is no longer in use comprise instructions to detect that an injected object corresponding to the application service has been released.

20. The computer system of claim 19, wherein the instructions to detect that the injected object has been released comprises instructions to access a reference to the injected object.

* * * * *